(12) United States Patent
Beattie, Jr. et al.

(10) Patent No.: US 10,142,085 B2
(45) Date of Patent: Nov. 27, 2018

(54) ASSIGNING AN ACCESS POINT BASED UPON A POWER STATE OF A MOBILE DEVICE

(71) Applicants: AT&T Intellectual Property I, L.P., Atlanta, GA (US); AT&T Mobility II LLC, Atlanta, GA (US)

(72) Inventors: James Gordon Beattie, Jr., Bergenfield, NJ (US); Haywood Peitzer, Randolph, NJ (US); Roque Rios, III, Middletown, NJ (US); Stephen Francis Triano, Hillsborough, NJ (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 120 days.

(21) Appl. No.: 15/169,310

(22) Filed: May 31, 2016

(65) Prior Publication Data

US 2017/0347360 A1   Nov. 30, 2017

(51) Int. Cl.
*H04L 5/14* (2006.01)
*H04W 52/02* (2009.01)
(Continued)

(52) U.S. Cl.
CPC .......... *H04L 5/1453* (2013.01); *H04W 48/20* (2013.01); *H04W 52/0212* (2013.01); *H04W 88/02* (2013.01); *H04W 88/08* (2013.01)

(58) Field of Classification Search
CPC ............ H04L 5/1453; H04W 52/0212; H04W 48/20; H04W 88/02; H04W 88/08
See application file for complete search history.

(56) References Cited

U.S. PATENT DOCUMENTS 7,313,399 B2   12/2007   Rhee et al.
7,340,615 B2   3/2008    Krantz et al.
(Continued)

FOREIGN PATENT DOCUMENTS

WO    WO 2014/075020    5/2014

OTHER PUBLICATIONS

Gambiroza, Bahareh Sadeghi, and Edward W. Knightly. "End-to-end performance and fairness in multihop wireless backhaul networks." MobiCom '04 Proceedings of the 10th annual international conference on Mobile computing and networking, pp. 287-301 ACM New York, NY. (2004). http://networks.blogs.rice.edu/files/2014/08/GSK04.pdf Discloses studying fairness and end-to-end performance in multihop wireless backhaul networks.
(Continued)

*Primary Examiner* — Omar J Ghowrwal

(57) ABSTRACT

In one example, a device for assigning a mobile endpoint device to an access point based upon a power state is disclosed. For example, the device may include a processor deployed in a wireless network and a computer-readable medium storing instructions which, when executed by the processor, cause the processor to perform operations. The operations may include detecting power states of a plurality of mobile endpoint devices that are in communication with a first access point of the network, the power states including a first power state of a first mobile endpoint device, determining a loading condition of a region of the wireless network that includes the first access point, and assigning the first mobile endpoint device to a second access point that is outside of the region when the first mobile endpoint device is in the first power state, in response to the determining of the loading condition.

20 Claims, 5 Drawing Sheets

(51) Int. Cl.
  *H04W 48/20* (2009.01)
  *H04W 88/02* (2009.01)
  *H04W 88/08* (2009.01)

(56) References Cited

U.S. PATENT DOCUMENTS

| | | | |
|---|---|---|---|
| 7,512,379 B2 | 3/2009 | Nguyen | |
| 7,570,969 B2 | 8/2009 | Hwang et al. | |
| 7,613,475 B2 | 11/2009 | Song et al. | |
| 7,620,370 B2 | 11/2009 | Barak et al. | |
| 7,924,783 B1 | 4/2011 | Mahany et al. | |
| 7,933,247 B2 | 4/2011 | Gidwani | |
| 7,965,669 B1 | 6/2011 | Tsai | |
| 8,014,329 B2 | 9/2011 | Gong | |
| 8,023,444 B2 | 9/2011 | Bowser et al. | |
| 8,305,958 B2 | 11/2012 | Iyer et al. | |
| 8,457,013 B2 | 6/2013 | Essinger et al. | |
| 8,498,230 B2 | 7/2013 | Kasslin et al. | |
| 8,605,637 B2 | 12/2013 | Aragon et al. | |
| 8,964,619 B2 | 2/2015 | Navda et al. | |
| 8,977,755 B2 | 3/2015 | Luna | |
| RE45,600 E | 7/2015 | Tsai, Jr. et al. | |
| 9,179,240 B2 | 11/2015 | Negus et al. | |
| 9,204,391 B2 | 12/2015 | Wu | |
| 9,282,539 B2 | 3/2016 | Tian et al. | |
| 9,288,764 B1 | 3/2016 | Banerjea et al. | |
| 9,485,702 B1* | 11/2016 | Chindapol | H04W 36/30 |
| 2007/0293223 A1* | 12/2007 | Kuwana | H04W 84/20 |
| | | | 455/436 |
| 2008/0117849 A1 | 5/2008 | Borran et al. | |
| 2008/0119215 A1* | 5/2008 | Ji | H04W 52/247 |
| | | | 455/522 |
| 2009/0185518 A1 | 7/2009 | Viswanath | |
| 2009/0190553 A1* | 7/2009 | Masuda | H04W 8/005 |
| | | | 370/331 |
| 2010/0302981 A1* | 12/2010 | Tsai | H04W 36/30 |
| | | | 370/311 |
| 2013/0278204 A1* | 10/2013 | Howard | H02J 7/0054 |
| | | | 320/107 |
| 2014/0355556 A1 | 12/2014 | Vermani et al. | |
| 2015/0131641 A1 | 5/2015 | Ong et al. | |

OTHER PUBLICATIONS

Feeney, L.M. and M. Nilsson. "Investigating the energy consumption of a wireless network interface in an ad hoc networking environment." INFOCOM 2001. Twentieth Annual Joint Conference of the IEEE Computer and Communications Societies. Proceedings, Apr. 22, 2001-Apr. 26, 2001. IEEE (vol. 3 ) p. 1548-1557 (2001). https://www.gnunet.org/sites/default/files/infocom0linvestigating.pdf Discloses a series of experiments which obtained detailed measurements of the energy consumption of an IEEE 802.11 wireless network interface operating in an ad hoc networking environment.

Anand, Manish, Edmund B. Nightingale, and Jason Flinn. "Self-tuning wireless network power management." Journal—Wireless Networks—Special issue: Selected papers from ACM MobiCom 2003. vol. 11 Issue 4, pp. 451-469: Jul. 2005. https://deepblue.lib.umich.edu/bitstream/handle/2027.42/41365/11276_2005_Article_1768.pdf?sequence =1 Discloses self-tuning power management (STPM) that adapts its behavior to the access patterns and intent of applications, the characteristics of the network interface, and the energy usage of the platform.

Tynan, R., et al, "Agents for wireless sensor network power management." 2005 International Conference on Parallel Processing Workshops (ICPPW'05), p. 413-418: Jun. 14-17, 2005, Oslo, Norway. http://www.prism.ucd.ie/publications/aic/wsnet05.pdf Discloses how the stronger notion of agency could be employed to allow a richer deliberation regarding potential decisions in power management of a wireless network.

Kansal, Aman, et al. "Power management in energy harvesting sensor networks." ACM Transactions on Embedded Computing Systems (TECS)—Special Section LCTES'05. vol. 6 Issue 4, Article No. 32: Sep. 2007. http://www.msr-waypoint.net/pubs/73674/kansal_TEC507.pdf Discloses networked systems with multiple energy harvesting nodes achieving the same end-user performance by using different workload allocations.

* cited by examiner

ASSIGNING AN ACCESS POINT BASED UPON A POWER STATE OF A MOBILE DEVICE

Embodiments of the present disclosure relate to managing power utilizations of mobile endpoint devices and network infrastructure in a radio access network environment.

BACKGROUND

Increased cellular network traffic demands can strain base stations, or eNodeBs, and other radio access network (RAN) resources. However, a mobile endpoint device is typically registered with an eNodeB that is the closest or which provides the greatest signal-to-noise ratio. In some cases, mobile endpoint devices may only register with alternative eNodeBs under loading conditions. For instance, in an urban environment with many eNodeBs and overlapping cells, any new registrations may be declined by an overloaded eNodeB, forcing the mobile endpoint devices not already registered to register with other nearby eNodeBs. Similarly, nearby eNodeBs may not initiate inter-cell handoffs to the eNodeB that is in a loading condition if the mobile endpoint devices can continue to be served by the nearby eNodeBs.

SUMMARY

In one embodiment, the present disclosure describes devices, computer-readable storage media, and methods for assigning a mobile endpoint device to an access point based upon a power state. For example, a device may include a processor deployed in a wireless network and a computer-readable medium storing instructions which, when executed by the processor, cause the processor to perform operations. The operations may include detecting power states of a plurality of mobile endpoint devices that are in communication with a first access point of the network. The power states may include a first power state of a first mobile endpoint device. The operations may further include determining a loading condition of a region of the wireless network that includes the first access point, and assigning the first mobile endpoint device to a second access point that is outside of the region when the first mobile endpoint device is in the first power state, in response to the determining of the loading condition of the region of the wireless network.

In another embodiment, the present disclosure describes devices, computer-readable storage media, and methods for selecting a type of modulation for communicating with a mobile endpoint device based upon a power state. For example, a device may include a processor deployed in a wireless network and a computer-readable medium storing instructions which, when executed by the processor, cause the processor to perform operations. The operations may include detecting a power state of a mobile endpoint device, the power state comprising: a battery operated state or an alternating current powered state. The operations may further include selecting a type of modulation for communicating with the mobile endpoint device based upon the power state that is detected. In one example, a first type of modulation is selected when the power state of the mobile endpoint device is the battery operated state and a second type of modulation is selected when the power state of the mobile endpoint device is the alternating current powered state. In one example, the first type of modulation may utilize less transmit power as compared to the second type of modulation. The operations may further include sending a notification of the type of modulation that is selected to the mobile endpoint device.

In another embodiment, the present disclosure describes devices, computer-readable storage media, and methods for assigning a mobile endpoint device to a second access point in response to detecting a power state of a first access point. For example, a device may include a processor deployed in a wireless network and a computer-readable medium storing instructions which, when executed by the processor, cause the processor to perform operations. The operations may include detecting a first power state of a first access point of the wireless network. In one example, the first access point utilizes a first power source when in the first power state and a second power source when in a second power state. The operations may further include detecting that a mobile endpoint device that is in communication with the first access point is in an alternating current powered state and assigning the mobile endpoint device to a second access point of the wireless network, in response to the detecting the first power state of the first access point, when the mobile endpoint device is in the alternating current powered state.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
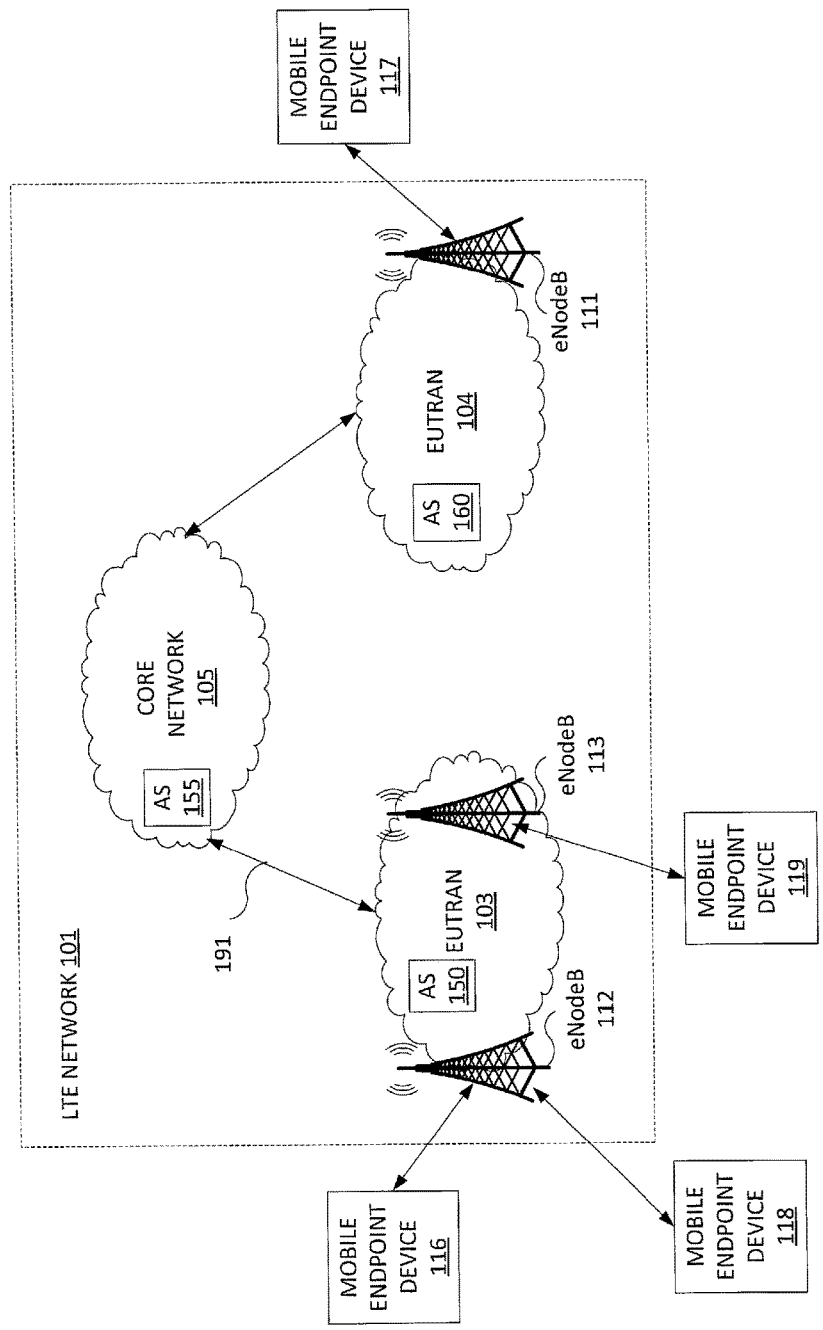
FIG. 1 illustrates an example network related to the present disclosure.

The present disclosure broadly describes devices, computer-readable storage media and methods for assigning a mobile endpoint device to an access point based upon a power state, for selecting a type of modulation for communicating with a mobile endpoint device based upon a power state, and for assigning a mobile endpoint device to a second access point in response to detecting a power state of a first access point. Although the present disclosure is discussed below in the context of illustrative Long Term Evolution (LTE) networks and evolved uniform terrestrial radio access networks (eUTRANs), the present disclosure is not so limited. Namely, the present disclosure can be applied to wireless networks in general, e.g., general packet radio service (GPRS) networks, uniform terrestrial radio access networks (UTRANs), Global System for Mobile Communications (GSM) networks, wireless local area network (WLANs), e.g., Wi-Fi™ networks utilizing Institute for Electrical and Electronics Engineers (IEEE) 802.11 communications, or long-range wireless networks, such as Worldwide Interoperability for Microwave Access (Wi-MAX™) networks utilizing IEEE 802.16 communications, and the like.

Examples of the present disclosure enable network-awareness of mobile endpoint device and wireless network infrastructure power capabilities, and provide for adjustments in service delivery based on the power states of various elements (mobile endpoint devices or wireless network infrastructure devices). For example, a mobile endpoint device may typically register with a primary access point, which may comprise a closest access point or an access point with the highest signal-to-noise (SNR) ratio, a highest signal-to-interference-and-noise (SINR) ratio, a received signal strength indication (RSSI), a lowest bit error rate (BER), and so forth, or any combination of such factors. As referred to herein, an access point may comprise a wireless access point, e.g., an IEEE 802.11 access point, such as a wireless router, an IEEE 802.16 access point, a cellular base station, a base transceiver station (BTS), a NodeB, an eNodeB, or the like. The selection and/or assignment of the primary access point may be further qualified by methods to determine when to hand-off from access point-to-access point, which may cause a mobile endpoint device to linger with a first access point until a SNR for a second access point exceeds the SNR of the first access point for the mobile endpoint device by a sufficient threshold, and so on. Nevertheless, the typical cell search and cell selection process combined with increased cellular network traffic demands can strain access points and other radio access network (RAN) resources. In some cases, mobile endpoint devices may only register with alternative access points under loading conditions. For instance, in an urban environment with many access points and overlapping cells, any new registrations may be declined by an overloaded access point, forcing the mobile endpoint devices not already registered to register with other nearby access points. Similarly, nearby access points may not initiate inter-cell hand-offs to the access points that is in a loading condition if the mobile endpoint devices can continue to be served by the nearby access points. However, this may be inefficient in terms of which mobile endpoint devices are diverted to secondary access points.

For example, battery-operated mobile endpoint devices can fall off the network prematurely due to battery limitations. However, if a battery-operated mobile endpoint device is blocked from registering with the primary access point, it may be forced to communicate with a secondary access point using more transmit power than would be the case with the primary access point, thereby accelerating the time until the battery is completely drained. In accordance with the present disclosure, different mobile endpoint devices may be served differently depending upon the respective power states. For example, the power state of a mobile endpoint device may comprise a battery operated state and an alternating current (AC) powered state. Alternatively, or in addition, possible power states of a mobile endpoint device may further include a high charge state and a low charge state, e.g., the low charge state comprising a state in which a mobile endpoint device battery has less charge as compared to the high charge state. For instance, a high charge state may comprise greater than 40 percent remaining available battery charge, greater than 50 percent, greater than 60 percent, and so on, whereas a low charge state may comprise less than 60 percent remaining available battery charge, less than 50 percent, less than 40 percent, and so on.

In one example, during a loading condition in a region of a wireless network, such as at an access point, in an RNC or BSC that serves multiple access points, on a shared backhaul, within a basic service set (BSS), and so on, the present disclosure may offload mobile endpoint devices from a primary access point within the region of the wireless network to a secondary access point that is outside of the region in order to alleviate the loading condition. The loading condition may comprise, for example, a number of mobile endpoint device registrations at an access point exceeding a threshold, a bandwidth utilization in a cell sector exceeding a threshold, a bandwidth utilization on a backhaul link shared by a number of access points exceeding a threshold bandwidth utilization, and so forth. Loading conditions may be precipitated by a failure of a radio network controller (RNC) causing an overloading at a failover RNC, an access point being deactivated for servicing and causing additional traffic to be offloaded to a nearby access point, a mass sporting event or entertainment event causing a large temporary concentration of mobile endpoint devices at a particular location, and so on.

In one example, the present disclosure may select at least one mobile endpoint device to offload from the primary access point to a secondary access point when the at least one mobile endpoint device is in an AC powered state. For instance, the AC powered state may comprise a state in which a device has a reliable power source, such as being plugged into a wall socket or otherwise connected to an electrical power grid, e.g., an electrical power distribution system that delivers between 100 volts and 240 volts of alternating current. In this state, a mobile endpoint device may communicate with an access point using a higher transmit power without draining a battery of the mobile endpoint device and without accelerating the time in which the battery is fully discharged. As such, mobile endpoint devices in this power state may be prioritized candidates for re-assignment, or offloading, to secondary access points which may be further away and/or which present lower SNRs, lower RSSIs, or the like, and which would therefore require higher transmit power from the mobile endpoint devices. Devices that are in a battery operated state may continue to be serviced by the primary access point. However, the loading condition in the region of the wireless network may be alleviated due to the offloading of the mobile endpoint devices in the AC powered state.

Alternatively, or in addition, mobile endpoint devices in a high charge state may also be prioritized (as compared to mobile endpoint devices in a low charge state) for re-assignment to a different access point. For instance, the offloading of mobile endpoint devices in the AC powered state may not sufficiently reduce the loading or alleviate the loading condition within the region of the network. As such, additional mobile endpoint devices may be evaluated for further re-assignment to secondary access points. In one example, mobile endpoint devices with a greater remaining available charge, or battery level (e.g., in the high charge state), may be prioritized over mobile endpoint devices with less remaining charge (e.g., in the low charge state). For instance, the mobile endpoint devices in the high charge state may be less likely to use up the remaining available battery charge if transferred to secondary access points as compared to mobile endpoint devices in the low charge state that may already have a small amount of remaining available charge.

In one example, power states of the mobile endpoint devices may be determined by the wireless network by the inclusion of power state indications in registration signaling messages or other signaling messages sent by the mobile endpoint devices to access points of the wireless network. In one example, the wireless network may track previous assignments of the plurality of mobile endpoint devices to secondary access points. In one example, during a loading condition of a region of the wireless network a mobile endpoint device may be assigned to a secondary access point when a number of previous assignments of the mobile endpoint device to secondary access points during a given time window, e.g., within the last 24 hours, within the last two weeks, and so forth, is below a threshold. In another example, a mobile endpoint device may be assigned to a secondary access point when a time since the mobile endpoint device has been assigned to a secondary access point exceeds a threshold. For instance, a loading condition with the region may be alleviated without reassigning all mobile endpoint devices in an AC powered state (and/or a high charge state) to secondary access points. Accordingly, further prioritizations for re-assignment may be made based upon which mobile endpoint devices have most recently and/or most frequently been subject to re-assignments. In other words, mobile endpoint devices that have been re-assigned less frequently or which have not been re-assigned for greater periods of time are more likely to be re-assigned than mobile endpoint devices that have been subjected to more frequent and/or more recent re-assignments to secondary access points. It should be noted that reassignments to secondary access points due to loading conditions may be counted, while reassignments due to other factors, such as mobile endpoint devices simply moving to different locations, may be excluded.

In another example of the present disclosure, a wireless network may react to a power state of a mobile endpoint device by selecting a type of modulation for communicating with the mobile endpoint device via an access point of the wireless network based upon the power state of the mobile endpoint device that is detected. For instance, a first type of modulation may be selected when the power state of the mobile endpoint device is the battery operated state and a second type of modulation is selected when the power state of the mobile endpoint device is the AC powered state, e.g., the first type of modulation utilizing less transmit power as compared to the second type of modulation. To illustrate, in one example, the first type of modulation may comprises a type of modulation that utilizes a plurality of physical channels, or carriers, and wherein the second type of modulation utilizes a single physical channel (e.g., a single carrier). In another example, the first type of modulation may comprise an M-quadrature amplitude modulation (M-QAM) and the second type of modulation may comprise an N-quadrature amplitude modulation (N-QAM), where M and N are even positive integers, and where M is greater than N. For instance, the first type of modulation may be 64-QAM and the second type of modulation may be 16-QAM, 8, QAM, etc. In another example, the first type of modulation may utilize a channel, or carrier, with a greater bandwidth as compared to the second type of modulation. In still another example, the first type of modulation may comprise a quadrature phase shift keying (QPSK) modulation, while the second type of modulation may comprise a binary phase shift keying (PSK) modulation or a differential phase shift keying (DPSK) modulation.

In one example, the selection of a type of modulation may be primarily for the benefit of the mobile endpoint device, e.g., to conserve battery charge when the mobile endpoint device is in the battery operated state. However, in another example, a selection of a type of modulation may also be driven by the power state of the access point that is in communication with the mobile endpoint device. For instance, an access point may be in a backup power state or in a reduced power state and may desire to reduce the overall power utilization of the access point. To achieve this goal, the access point may utilize a less power intensive type of modulation to communicate with at least one selected mobile endpoint device. The mobile endpoint device may be in a battery operated state, for example. While the mobile endpoint device may communicate with the access point at a reduced data rate, this diminishment in service may be offset by the benefit of reduced battery consumption at the mobile endpoint device(s).

In another aspect, the present disclosure may assign a mobile endpoint device to a second access point of a wireless network in response to detecting a power state of a first access point. For instance, the mobile endpoint device may be registered with the first access point, or may be in the process of attempting to register with the first access point as a primary access point according to a cell selection method during a network registration process. In an illustrative example, the first access point may be in a backup power state, such as using a battery, a generator, solar power, etc. In another example, the first access point may transition to a backup power state from another power state. In response to determining that the first access point is in a backup power state, to conserve battery charge, fuel for a generator, or to accommodate a reduced power level of the power source, a reduced overall transmit power may be implemented at the first access point, e.g., during a power outage or a weather related condition. To achieve this goal, at least one mobile endpoint device may be re-assigned to a different access point. In one example, a mobile endpoint device, or multiple mobile endpoint devices that are in an AC powered state may be selected for re-assignment to at least one secondary access point. As described above, a mobile endpoint device with a steady power supply will not lose battery charge, despite having to utilize more transmit power to communicate with a secondary access point. In addition, the first access point may utilize less overall transmit power by having at least one less mobile endpoint device to serve.

In one example, a mobile endpoint device may be assigned to a secondary access point when both a number of previous assignments of the mobile endpoint device to secondary access points during a given time window, e.g., within the last 24 hours, within the last two weeks, and so forth, is below a threshold, and the mobile endpoint device is in the AC powered state. In another example, a mobile endpoint device may be assigned to a secondary access point when both a time since the mobile endpoint device has been assigned to a secondary access point exceeds a threshold, and the mobile endpoint device is in the AC powered state. In one example, re-assignments of mobile endpoint devices may be voluntary. For example, a mobile endpoint device that is selected for assignment (or reassignment) to a secondary access point in accordance with the present disclosure may be invited to register with a secondary access point, rather than being required to do so. In one example, the voluntary registration with a secondary access point may be incentivized, such as by providing additional data usage for free or reduced cost, providing a discount on a monthly service bill, and so forth.

In one example, mobile endpoint devices in particular cell sectors or at the edges of a cell which are in the AC powered state may be prioritized for offloading, as compared to mobile endpoint devices in other sectors or those closer to the access point. For example, if mobile endpoint devices at the cell edge can be offloaded, the access point may reduce the cell footprint and antenna gain pattern across one or more sectors in order to reduce the overall transmit power. In one example, if mobile endpoint devices in a particular sector or in a particular direction can be offloaded, the access point may reduce transmit power in the sector that is now serving fewer mobile endpoint devices, or may utilize beam steering techniques to direct a null, or a region of reduced gain in the direction in which the most mobile endpoint devices have been offloaded, while maintaining a pattern of greater gain in other directions, and at the same time reducing the overall transmit power utilization of the access point.

To further aid in understanding the present disclosure, FIG. 1 illustrates an example network 100 related to the present disclosure. In one illustrative example, the network 100 comprises an LTE network 101 and mobile endpoint devices 116-119, e.g., LTE "user equipment" (UE). Any of the mobile endpoint devices 116-119 can be a smart phone, a cellular phone, a computer or laptop, a computing tablet, or any endpoint communication devices equipped with wireless capabilities. The LTE network 101 may comprise access networks, e.g., evolved Universal Terrestrial Radio Access Networks (eUTRANs) 103 and 104, and a core network 105. In one example, the core network 105 comprises an Evolved Packet Core (EPC) network.

The eUTRANs are the air interfaces of the 3$^{rd}$ Generation Partnership Project (3GPP) LTE specifications for mobile networks. Namely, an eUTRAN comprises a radio access network standard to replace previous generations of air interface standards. All eNodeBs in the eUTRANs 103 and 104 are in communication with the core network 105. An EPC network provides various functions that support wireless services in the LTE environment. In one embodiment, an EPC network is an Internet Protocol (IP) packet core network that supports both real-time and non-real-time service delivery across a LTE network, e.g., as specified by the 3GPP standards.

In operation, mobile endpoint devices 116 and 118 may access wireless services via the eNodeB 112 located in the eUTRAN 103. Mobile endpoint device 119 may access wireless services via the eNodeB 113 located in the eUTRAN 103. Similarly, the mobile endpoint device 117 may access wireless services via the eNodeB 111 located in the eUTRAN 104. It should be noted that any number of eNodeBs can be deployed in an eUTRAN. Thus, the particular configuration of network 100 is provided in FIG. 1 for illustrative purposes only and should not be interpreted as a limitation of the present disclosure.

In one example, a loading condition may be detected in a region of the network 100. For example, a loading condition may be detected by application server (AS) 150, or one of the application servers 155 or 160. The region of the network 100 may comprise for example, eNodeB 112 or eUTRAN 103. In one example, the loading condition may comprise, for example, a number of mobile endpoint device registrations at eNodeB 112 exceeding a threshold, a bandwidth utilization in a cell sector of eNodeB 112 exceeding a threshold, a bandwidth utilization on a backhaul link, e.g., link 191, exceeding a threshold bandwidth utilization, and so forth. In another example, eNodeB 113 may fail or be taken offline for service, thereby causing an overloading at eNodeB 112. In additional examples, the loading condition may be triggered by a volume of traffic to be processed by components of core network 105 exceeding a capacity, a failure or other problem with components of core network 105 causing failover components or other remaining components to be overloaded, and so forth. Components of core network 105 may include a home subscriber server (HSS), a mobility management entity (MME), a service gateway (SGW), and so forth. The foregoing represent just several example components of an LTE network. Thus, in other examples, representative network components may comprise a mobile switching center (MSC), a visiting location register (VLR), a serving general packet radio service (GPRS) support node (SGSN), a service call session control function (S-CSCF), and so forth.

In one example, application servers 150, 155, and 160 may comprise stand-alone components, or may be integrated in one or more of the other components of core network 105 and/or eUTRANs 103 and 104. For instance, in one example, application server 160 may be integrated within eNodeB 111, application server 155 may be integrated within a MME of core network 105 and so forth. In one example, each of the application servers 150, 155, and 160 may comprise a computing device, such as device 500 of FIG. 5, comprising a processor and a computer-readable medium storing instructions which, when executed by the processor, cause the processor to perform operations as described herein for assigning a mobile endpoint device to an access point based upon a power state, for selecting a type of modulation for communicating with a mobile endpoint device based upon a power state, and/or for assigning a mobile endpoint device to a second access point in response to detecting a power state of a first access point.

In an illustrative example, a loading condition may be detected in a region comprising eNodeB 112, e.g., by application server 150. The loading condition may be caused by any number of factors, as described above. In addition, the loading condition may be detected in any number of ways. For example, components of network 100 may collect usage statistics and track various network conditions, such as a number of registered mobile endpoint devices at an eNodeB, a bandwidth utilization, a transmit power per cell sector, and so on. In addition, the network components may compare the data collected to one or more thresholds that may be indicative of loading conditions. For instance, greater than 10,000 mobile endpoint device registrations per eNodeB may be considered to be a loading condition. Components of network 100 may then send messages to application server 150 indicating a loading condition is occurring. In another example, network components may send usage statistics and other data regarding network conditions to the application server 150, which may then compare the usage statistics and other data to various thresholds to determine a loading condition in a region of the network 100, e.g., at eNodeB 112.

In one example, to alleviate the loading condition, application server 150 may send an instruction to at least one of mobile endpoint device 116 or mobile endpoint device 118 to cause the at least one mobile endpoint device to register with a different eNodeB. For instance, application server 150 may determine that mobile endpoint device 116 is in an AC powered state, or in a high charge state. In one example, mobile endpoint devices 116 and 118 may also send power state information in registration signaling messages, or other signaling messages that are sent to eNodeB 111. In turn, eNodeB 111 may forward the signaling messages and/or power state information to application server 150 and/or to other components of core network 105. As described above, mobile endpoint devices in an AC powered state or in a high charge state may be prioritized for re-assignment/offloading to different regions of the network. Thus, in one example, application server 150 may send an instruction to mobile endpoint device 116 to register with eNodeB 113, or eNodeB 111 in eUTRAN 103. In another example, the instruction may inform mobile endpoint device 116 that it is blocked from registering with eNodeB 112. In this case, mobile endpoint device 116 may select a different eNodeB according to a cell selection method. In one example, the selection may result in the registration of mobile endpoint device 116 with eNodeB 113 or eNodeB 111, depending upon which eNodeB is closer and/or which eNodeB presents a higher SNR, a higher RSSI, or the like for communications with the mobile endpoint device 116.

In another illustrative example, a loading condition may be detected in a region comprising eUTRAN 103. In such an example, application server 150 and/or application server 155 may detect the loading condition, and may evaluate mobile endpoint devices 116, 118, and 119, in response to detecting the loading condition, in order to determine at least one mobile endpoint device to reassign to an eNodeB that is outside of the region, e.g., to eNodeB 111 in eUTRAN 104, or elsewhere.

In still another illustrative example, a first power state of a first eNodeB may be detected, and a mobile endpoint device may be assigned to a different eNodeB in response to the detection of the first power state of the first eNodeB. For instance, application server 150 may detect that eNodeB 112 is in a backup power state, in which a different power source is utilized as compared to when the eNodeB 112 is a normal power state. For example, in the normal power state, eNodeB 112 may utilize a primary power source, such as alternating current from an electrical power grid. In such an example, application server 150 may further evaluate mobile endpoint devices 116 and 118, which are registered with eNodeB 112, to determine which of these devices may be operating in an AC powered state or a high charge state, and which of these devices may be operating in a battery operated state and/or in a low charge state. In one example, it may be determined that mobile endpoint device 116 is in an AC powered state or a high charge state. Thus, as described above, mobile endpoint device 116 may be prioritized for reassignment to a different eNodeB, e.g., a secondary eNodeB that may be further away, or which presents a lower SNR, a lower RSSI, or the like, such as eNodeB 111. By offloading at least one mobile endpoint device from eNodeB 112, eNodeB 112 may utilize less overall transmit power, which may conserve battery life, generator fuel, and so forth, depending upon the particular type of backup power that is implemented.

In one example, the offloading may also account for the locations of mobile endpoint devices 116 and 118 in a cell of eNodeB 112. For instance, when mobile endpoint device 116 is in an AC powered state or a high charge state, and is also at a cell edge, in a particular cell sector, or located in a particular direction from the eNodeB 112, mobile endpoint device 116 may be prioritized for offloading. For example, mobile endpoint device 116 may be prioritized as compared to other mobile endpoint devices in an AC powered state or a high charge state, but which are not at the edge/closer to the eNodeB 112, not in the particular sector, not in the particular direction, etc. For instance, eNodeB 112 may reduce an overall antenna gain pattern for the cell, or an antenna gain pattern for the particular sector, or may direct a null or region of reduced gain in the particular direction in which the reassignment/offloading of mobile endpoint devices is most concentrated.

In another example, a power state of a mobile endpoint device may be detected, and a type of modulation may be adjusted for communicating with the mobile endpoint device based upon the power state that is detected. For example, AS 160 may detect that mobile endpoint device 117 is in a battery operated state or in an AC powered state. In one example, mobile endpoint device 117 may send power state information in the registration signaling messages, or other signaling messages that are sent to eNodeB 111. In one example, eNodeB 111 may extract the power state information from such signaling messages and send the power state information to application server 160. In another example, eNodeB 111 may send copies of signaling messages to application server 160, where application server 160 may extract power state information of mobile endpoint devices from the signaling messages.

In any event, in one example, application server 160 may determine that a type of modulation that consumes less transmit power (e.g., in a given time period) should be utilized when the mobile endpoint device 117 is in a battery operated state and/or in a low charge state, and that a type of modulation that may consume relatively more transmit power (but which may provide for faster data transfer rates), should be utilized when the mobile endpoint device 117 is in an AC powered state and/or in a high charge state. In one example, the first type of modulation may comprise a type of modulation that utilizes a plurality of physical channels, or carriers, while the second type of modulation may utilize a single physical channel (e.g., a single carrier). In another example, the first type of modulation may comprise an M-quadrature amplitude modulation (M-QAM) and the second type of modulation may comprise an N-quadrature amplitude modulation (N-QAM), where M and N are even positive integers, and where M is greater than N. In another example, the first type of modulation may utilize a channel, or carrier, with a greater bandwidth as compared to the second type of modulation. In still another example, the first type of modulation may comprise QPSK modulation, while the second type of modulation may comprise PSK modulation or DPSK modulation. In one example, the type of modulation that is selected may be communicated by application server 160 to mobile endpoint device 117 via eNodeB 111.

The above network 100 is described to provide an illustrative environment in which embodiments of the present disclosure may be employed. In other words, the network 100 is merely illustrative of one network configuration that is suitable for implementing embodiments of the present disclosure. Thus, the present disclosure may also include any other different network configurations that are suitable for implementing embodiments of the present disclosure, for conveying communications among mobile endpoint devices, for conveying communications between mobile endpoint devices and other components (e.g., core network and access network components), and so forth. Those skilled in the art will realize that the communication system 100 is presented in a simplified form with many network components having been omitted to increase clarity of the present disclosure. Thus, communication system 100 may be expanded by including additional mobile endpoint devices, access networks, network elements, application servers, etc., or modifying or substituting those illustrated in FIG. 1, without altering the scope of the present disclosure.

Figure 2:
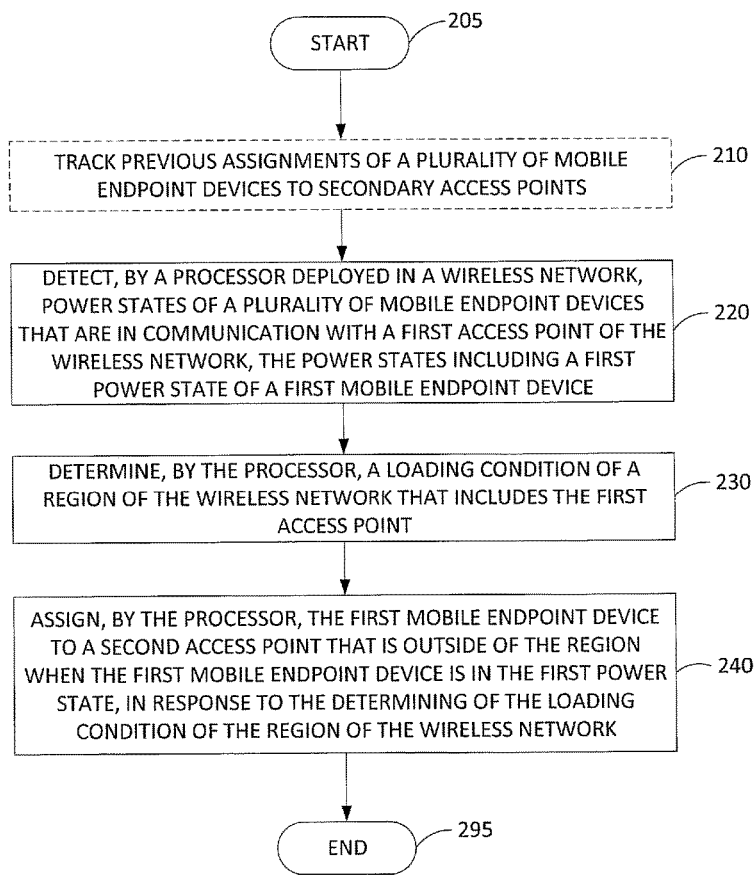
FIG. 2 illustrates a flowchart of an example method for assigning a mobile endpoint device to an access point based upon a power state, according to embodiments of the present disclosure.

FIG. 2 illustrates a flowchart of an example method 200 for assigning a mobile endpoint device to an access point based upon a power state. In one embodiment, the method 200 is performed by an access point, such an eNodeB, or an application server (AS), such as illustrated in FIG. 1, or any one of such component in conjunctions with other components of a network. Alternatively, or in addition, the steps, functions, or operations of method 200 may be performed by a computing device or system 500, and/or processor 502 as described in connection with FIG. 5 below. For illustrative purposes, the method 200 is described in greater detail below in connection with an example performed by a processor, such as processor 502, which may be deployed in a wireless network, e.g., a cellular network, an IEEE 802.16 network, or the like.

Method 200 starts in step 205 and may proceed to optional step 210. In optional step 210, the processor may track previous assignments of a plurality of mobile endpoint devices to secondary access points. For example, a number of previous assignments within a time period or a duration of time since a last assignment of a mobile endpoint device to a secondary access point may be used as factors in determining whether or not to prioritize an assignment of the mobile endpoint device to a secondary access point at a current time. For purposes of optional step 210, the previous assignments to secondary access points may include those assignments based upon power state information and may exclude assignments due to other events, such as mobile endpoint devices simply moving to different locations. In one example, the processor may store the previous assignments in a computer-readable storage medium, e.g., a physical memory or a storage device that is attached to or remote from the processor for later retrieval.

In step 220, the processor detects power states of the plurality of mobile endpoint devices. In one example, the plurality of mobile endpoint devices comprises mobile endpoint devices that are in communication with a first access point of the wireless network. For example, the mobile endpoint device may be assigned to the first access point and may receive network services of the wireless network via the first access point. In one example, power states of the plurality of mobile endpoint devices may be determined by the processor from the inclusion of power state indications in registration signaling messages or other signaling messages sent by the mobile endpoint devices to access points of the wireless network. In one example, the power states of the plurality of mobile endpoint devices may include a first power state of a first mobile endpoint device. For example, the first power state may comprise an AC powered state or a high charge state. Other possible power states may include a battery operated state and a low charge state, for example.

In step 230, the processor determines a loading condition of a region of the wireless network that includes the first access point. The region of the wireless network may comprise, for example: an access point (and a cell surrounding the access point that may include a number of mobile endpoint devices), a cell sector, a cluster of access points, a UTRAN, or eUTRAN, a basic service set (BSS), and so on. The loading condition may comprise, for example, a number of mobile endpoint device registrations at an access point exceeding a threshold, a bandwidth utilization in a cell sector exceeding a threshold, a bandwidth utilization on a backhaul link shared by a number of access points exceeding a threshold bandwidth utilization, and so forth. Loading conditions may be precipitated by a failure at a component of the wireless network causing an overloading at a failover component, such an access point being deactivated for servicing and causing additional traffic at a nearby access point, a mass sporting event or entertainment event causing a large temporary concentration of mobile endpoint devices, and so on.

The loading condition may be detected in any number of ways. For example, components of the wireless network may collect usage statistics and track various network conditions, such as a number of registered mobile endpoint devices registered to the access point, a bandwidth utilization, a transmit power per cell sector, and so on. In addition, the wireless network components may compare the data collected to one or more thresholds that may be indicative of loading conditions. For instance, greater than 10,000 mobile endpoint device registrations per access point may be considered to be a loading condition. Components of the wireless network may then send messages to the processor indicating a loading condition is occurring. However, in another example, network components may send usage statistics and other data regarding network conditions to the processor, which may then compare the usage statistics and other data to various thresholds to determine a loading condition in a region of the wireless network as part of the operations of step 230.

In step 240, the processor assigns the first mobile endpoint device to a second access point that is outside of the region when the first mobile endpoint device is in the first power state, in response to the determining of the loading condition in the region of the wireless network. The second access point may comprise a "secondary" access point with respect to the first mobile endpoint device. For example, the first mobile endpoint device may perform a cell selection method during a network registration process and determine that the first access point is the access point that is the closest, presents the highest SNR, RSSI, or the like. Thus, the first access point may be considered as the "primary" access point with respect to the first mobile endpoint device. However, there may be other access points within wireless communication range of the first mobile endpoint device which may be considered "secondary" access points. The first mobile endpoint device may already be registered with the wireless network via the first access point and may be assigned to the first access point, or may be in the process of seeking to register with the wireless network, but may not be assigned to a particular access point at the time of the operations of step 240.

In one example, the processor may select the second access point for the first mobile endpoint device and notify the first mobile endpoint device that it should register with the second access point. In another example, the processor may send a notification that the first access point is unavailable to the first mobile endpoint device or may deny a registration at the first access point, which may cause the first mobile endpoint device to select the second access point as a next-best access point according to a cell selection method. In one example, the first mobile endpoint device is assigned to the second access point when the first mobile endpoint device is in a particular cell sector, at the edge of a cell associated with the first access point, or in a particular direction from the first access point, in addition to being in the first power state, e.g., an AC powered state or a high charge state. Additional mobile endpoint devices of the plurality of mobile endpoint devices may be similarly prioritized for assignment to secondary access points based upon the respective locations and/or orientations with respect to the first access point.

Following step 240, the method 200 proceeds to step 295 where the method ends.

Figure 3:
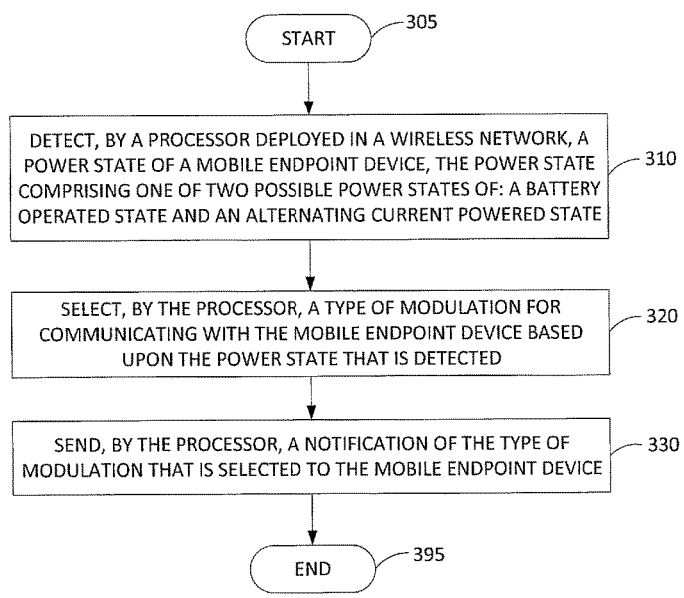
FIG. 3 illustrates a flowchart of an example method for selecting a type of modulation for communicating with a mobile endpoint device based upon a power state, according to embodiments of the present disclosure.

FIG. 3 illustrates a flowchart of an example method 300 for selecting a type of modulation for communicating with a mobile endpoint device based upon a power state. In one embodiment, the method 300 is performed by an access point, such an eNodeB, or an application server (AS), such as illustrated in FIG. 1, or any one of such component in conjunctions with other components of a network. Alternatively, or in addition, the steps, functions, or operations of method 300 may be performed by a computing device or system 500, and/or processor 502 as described in connection with FIG. 5 below. For illustrative purposes, the method 300 is described in greater detail below in connection with an example performed by a processor, such as processor 502, which may be deployed in a wireless network.

Method 300 starts in step 305 and proceeds to step 310. In step 310, the processor detects a power state of a mobile endpoint device, wherein the power state comprise one of two possible power states of: a battery operated state and an AC powered state. In one example, the detecting of the power state of the mobile endpoint device may comprise similar operations as described above in connection with step 220 of the method 200.

In step 320, the processor selects a type of modulation for communicating with the mobile endpoint device based upon the power state that is detected. For example, a first type of modulation may be selected when the power state of the mobile endpoint device is in the battery operated state and a second type of modulation is selected when the power state of the mobile endpoint device is in the AC powered state. In one example, the first type of modulation may utilize less transmit power as compared to the second type of modulation. In one example, the first type of modulation may comprise a type of modulation that utilizes a plurality of physical channels, or carriers, and wherein the second type of modulation utilizes a single physical channel (e.g., a single carrier). In another example, the first type of modulation may comprise an M-quadrature amplitude modulation (M-QAM) and the second type of modulation may comprise an N-quadrature amplitude modulation (N-QAM), where M and N are even positive integers, and where M is greater than N. In another example, the first type of modulation may utilize a channel, or carrier, with a greater bandwidth as compared to the second type of modulation. In still another example, the first type of modulation may comprise a quadrature phase shift keying (QPSK) modulation, wherein the second type of modulation may comprise a binary phase shift keying (PSK) modulation or a differential phase shift keying (DPSK) modulation.

In step 330, the processor sends a notification of the type of modulation that is selected to the mobile endpoint device. For instance, the mobile endpoint device may utilize the assigned type of modulation for communications with an access point of the wireless network. In one example, the notification may be included in at least one signaling message sent to the mobile endpoint device via an access point during a network registration process. In another example, the notification may be sent after the mobile endpoint device is registered with the wireless network and after the mobile endpoint device is assigned to an access point. For example, the mobile endpoint device may initially be in a battery operated state, but may then subsequently be plugged into an AC outlet, thereby changing the mobile endpoint device to an AC powered state. Thus, in one example, the notification may be sent in a message that is not associated with a registration process.

Following step 330, the method 300 proceeds to step 395 where the method ends.

Figure 4:
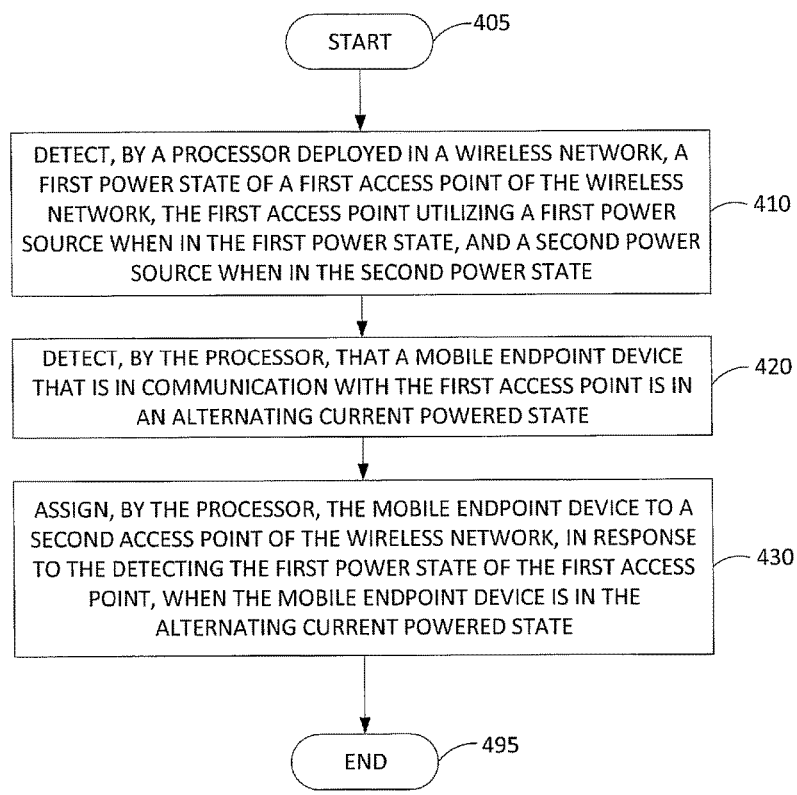
FIG. 4 illustrates a flowchart of an example method for assigning a mobile endpoint device to a second access point in response to detecting a power state of a first access point, according to embodiments of the present disclosure.

FIG. 4 illustrates a flowchart of an example method 400 for assigning a mobile endpoint device to a second access point in response to detecting a power state of a first access point. In one embodiment, the method 300 is performed by an access point, such an eNodeB, or an application server (AS), such as illustrated in FIG. 1, or any one of such component in conjunctions with other components of a network. Alternatively, or in addition, the steps, functions, or operations of method 400 may be performed by a computing device or system 500, and/or processor 502 as described in connection with FIG. 5 below. For illustrative purposes, the method 400 is described in greater detail below in connection with an example performed by a processor, such as processor 502, which may be deployed in a wireless network.

Method 400 starts in step 405 and proceeds to step 410. In step 410, the processor detects a first power state of a first access point of the wireless network. For example, the first access point may utilize a first power source when in the first power state and may utilize a second power source when in the second power state. For example, in the first power state, the first access point may utilize a primary power source, such as alternating current from an electrical power grid, while in the second power state, the first access point may utilize a backup power source, such as using a battery, a generator, solar power, etc.

In step 420, the processor detects that a mobile endpoint device that is in communication with the first access point is in an alternating current powered state. For example, the mobile endpoint device may be assigned to the first access point and may receive network services of the wireless network via the first access point. In one example, the power state of the of mobile endpoint device may be determined by the wireless network by the inclusion of power state indications in registration signaling messages or other signaling messages sent by the mobile endpoint device to the first access point. In one example, the processor may detect power states of a plurality of mobile endpoint devices that are assigned to or otherwise in communication with the first access point.

In step 430, the processor assigns the mobile endpoint device to a second access point of the wireless network, in response to detecting the first power state of the first access point, when the mobile endpoint device is in the AC powered state. The first access point may comprise a "primary" access point with respect to the mobile endpoint device, while the second access point may comprise a "secondary" access point. In one example, the processor may select the second access point for the mobile endpoint device and notify the mobile endpoint device that it should register with the second access point. In another example, the processor may send a notification that the first access point is unavailable to the mobile endpoint device or may deny a registration at the first access point, which may cause the mobile endpoint device to select the second access point as a next-best access point according to a cell selection method.

In one example, the mobile endpoint device may be assigned to the second access point when the mobile endpoint device is in a particular cell sector, at the edge of a cell associated with the first access point, or in a particular direction from the first access point, in addition to being in the AC powered state. Additional mobile endpoint devices associated with the first access point may be similarly prioritized for assigning to secondary access points based upon the respective locations and/or orientations with respect to the first access point.

Following step 430, the method 400 proceeds to step 495 where the method ends.

It should be noted that although not specifically specified, one or more steps, functions or operations of the respective methods 200, 300 and 400 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIG. 2, FIG. 3, or FIG. 4 that recite a determining operation or involve a decision do not necessarily require that both branches of the determining operation be practiced. In other words, one of the branches of the determining operation can be deemed as an optional step. In addition, one or more steps, blocks, functions, or operations of the above described methods 200, 300, and 400 may comprise optional steps, or can be combined, separated, and/or performed in a different order from that described above, without departing from the example embodiments of the present disclosure.

Figure 5:
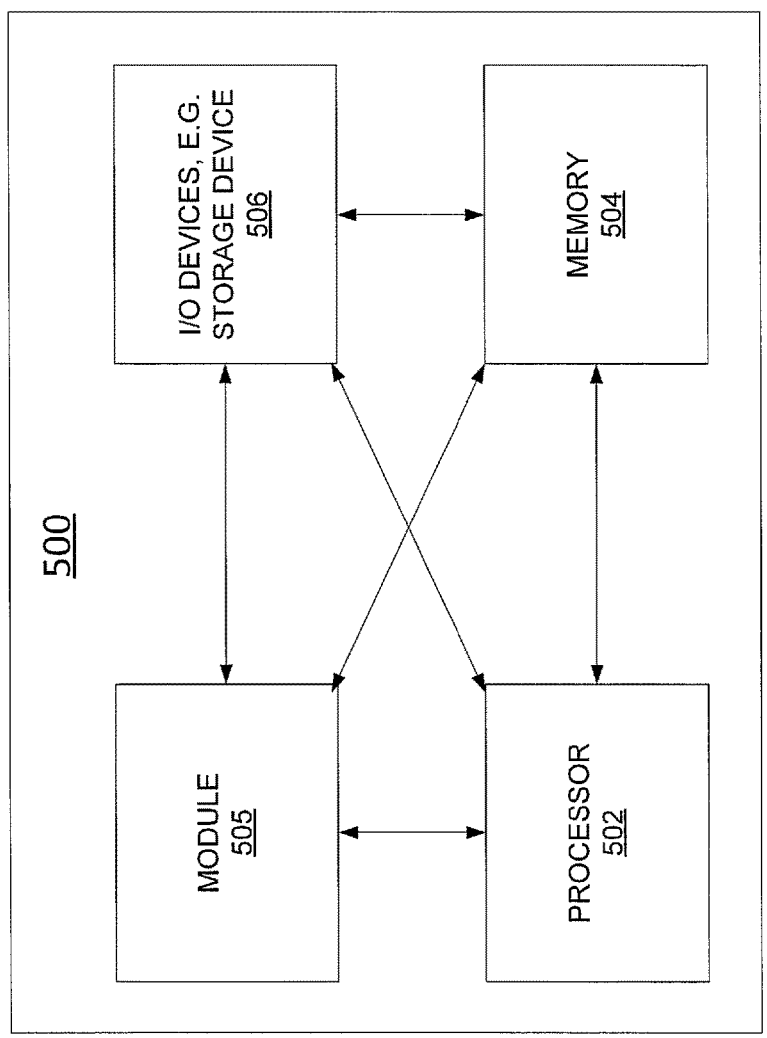
FIG. 5 illustrates a high-level block diagram of a computer specifically programmed the steps, functions, blocks, and/or operations described herein.

FIG. 5 depicts a high-level block diagram of a computing device specifically programmed to perform the functions described herein. As depicted in FIG. 5, the system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for assigning a mobile endpoint device to an access point based upon a power state, for selecting a type of modulation for communicating with a mobile endpoint device based upon a power state, and/or for assigning a mobile endpoint device to a second access point in response to detecting a power state of a first access point, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200, method 300, or method 400 as discussed above is implemented in a distributed or parallel manner for a particular illustrative example, i.e., the steps of the above method 200, method 300, or method 400, or the entire method is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200, method 300, or method 400. In one embodiment, instructions and data for the present module or process 505 for assigning a mobile endpoint device to an access point based upon a power state, for selecting a type of modulation for communicating with a mobile endpoint device based upon a power state, and/or for assigning a mobile endpoint device to a second access point in response to detecting a power state of a first access point (e.g., a software program comprising computer-executable instructions) can be loaded into memory 504 and executed by hardware processor element 502 to implement the steps, functions or operations as discussed above in connection with the illustrative method 200, method 300, or method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for assigning a mobile endpoint device to an access point based upon a power state, for selecting a type of modulation for communicating with a mobile endpoint device based upon a power state, and/or for assigning a mobile endpoint device to a second access point in response to detecting a power state of a first access point (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A device, comprising:
  a processor deployed in a wireless network; and
  a computer-readable medium storing instructions which, when executed by the processor, cause the processor to perform operations, the operations comprising:
    detecting power states of a plurality of mobile endpoint devices that are in communication with a first access point of the wireless network, the power states including a first power state of a first mobile endpoint device of the plurality of mobile endpoint devices, wherein the first power state is one of: a battery operated state or an alternating current powered state;
    determining a loading condition of a region of the wireless network that includes the first access point; and assigning the first mobile endpoint device to a second access point that is outside of the region in response to the detecting the first mobile endpoint device is in the first power state and the determining of the loading condition of the region of the wireless network.

2. The device of claim 1, wherein the battery operated state comprises:
   a high charge state; or
   a low charge state, the low charge state comprising a state in which a mobile endpoint device battery has less charge as compared to the high charge state.

3. The device of claim 1, wherein the first mobile endpoint device utilizes a higher transmit power to communicate with the second access point, as compared to a lower transmit power to communicate with the first access point.

4. The device of claim 1, wherein the power states of the plurality of mobile endpoint devices are detected via power state indications from the plurality of mobile endpoint devices.

5. The device of claim 4, wherein the power state indications are contained within signaling messages from the plurality of mobile endpoint devices.

6. The device of claim 1, wherein the first access point comprises a primary access point for registrations of the plurality of mobile endpoint devices with the wireless network, and wherein the second access point comprises a secondary access point for registration of at least a portion of the plurality of mobile endpoint devices.

7. The device of claim 6, wherein the operations further comprise:
   tracking previous assignments of the plurality of mobile endpoint devices to a plurality of secondary access points, wherein the plurality of secondary access points includes the secondary access point.

8. The device of claim 7, wherein the first mobile endpoint device is assigned to the second access point when a number of previous assignments of the first mobile endpoint device to the plurality of secondary access points is below a threshold.

9. The device of claim 7, wherein the first mobile endpoint device is assigned to the second access point when a time since the first mobile endpoint device has been assigned to the secondary access point exceeds a threshold.

10. A method comprising:
    detecting, by a processor deployed in a wireless network, power states of a plurality of mobile endpoint devices that are in communication with a first access point of the wireless network, the power states including a first power state of a first mobile endpoint device of the plurality of mobile endpoint devices, wherein the first power state is one of: a battery operated state or an alternating current powered state;
    determining, by the processor, a loading condition of a region of the wireless network that includes the first access point; and
    assigning, by the processor, the first mobile endpoint device to a second access point that is outside of the region in response to the detecting the first mobile endpoint device is in the first power state and the determining of the loading condition of the region of the wireless network.

11. The method of claim 10, wherein the battery operated state comprises:
    a high charge state; or
    a low charge state, the low charge state comprising a state in which a mobile endpoint device battery has less charge as compared to the high charge state.

12. The method of claim 10, wherein the first mobile endpoint device utilizes a higher transmit power to communicate with the second access point, as compared to a lower transmit power to communicate with the first access point.

13. The method of claim 10, wherein the power states of the plurality of mobile endpoint devices are detected via power state indications from the plurality of mobile endpoint devices.

14. The method of claim 13, wherein the power state indications are contained within signaling messages from the plurality of mobile endpoint devices.

15. The method of claim 10, wherein the first access point comprises a primary access point for registrations of the plurality of mobile endpoint devices with the wireless network, and wherein the second access point comprises a secondary access point for registration of at least a portion of the plurality of mobile endpoint devices.

16. The method of claim 15, further comprising:
    tracking previous assignments of the plurality of mobile endpoint devices to a plurality of secondary access points, wherein the plurality of secondary access points includes the secondary access point.

17. The method of claim 16, wherein the first mobile endpoint device is assigned to the second access point when a number of previous assignments of the first mobile endpoint device to the plurality of secondary access points is below a first threshold or when a time since the first mobile endpoint device has been assigned to the secondary access point exceeds a second threshold.

18. A non-transitory computer-readable medium storing instructions which, when executed by a processor deployed in a wireless network, cause the processor to perform operations, the operations comprising:
    detecting power states of a plurality of mobile endpoint devices that are in communication with a first access point of the wireless network, the power states including a first power state of a first mobile endpoint device of the plurality of mobile endpoint devices, wherein the first power state is one of: a battery operated state or an alternating current powered state;
    determining a loading condition of a region of the wireless network that includes the first access point; and
    assigning the first mobile endpoint device to a second access point that is outside of the region in response to the detecting the first mobile endpoint device is in the first power state and the determining of the loading condition of the region of the wireless network.

19. The non-transitory computer-readable medium of claim 18, wherein the battery operated state comprises:
    a high charge state; or
    a low charge state, the low charge state comprising a state in which a mobile endpoint device battery has less charge as compared to the high charge state.

20. The non-transitory computer-readable medium of claim 18, wherein the first mobile endpoint device utilizes a higher transmit power to communicate with the second access point, as compared to a lower transmit power to communicate with the first access point.

* * * * *